United States Patent [19]
Glick et al.

[11] Patent Number: 5,170,948
[45] Date of Patent: Dec. 15, 1992

[54] FINE MATERIAL DISTRIBUTOR

[75] Inventors: Joseph S. Glick, Bird-In-Hand; Glenn A. Musser, New Holland; David R. Miller, Jr., Strasburg, all of Pa.

[73] Assignee: Millcreek Manufacturing, Bird-In-Hand, Pa.

[21] Appl. No.: 698,107

[22] Filed: May 10, 1991

[51] Int. Cl.$^5$ .............................................. E01C 19/20
[52] U.S. Cl. .................................... 239/666; 239/676; 239/679; 239/681
[58] Field of Search ............... 239/665, 666, 672, 676, 239/679, 681, 689

[56] References Cited

U.S. PATENT DOCUMENTS

| Re. 25,503 | 12/1963 | Kucera et al. | 239/681 X |
|---|---|---|---|
| 104,694 | 6/1870 | Burnett | 239/672 |
| 425,338 | 4/1890 | Muller | 239/689 X |
| 1,856,417 | 5/1932 | Hyland | 239/676 |
| 2,876,039 | 3/1959 | Vogdt . | |
| 2,958,530 | 11/1960 | Kucera et al. | 239/681 X |
| 3,095,202 | 6/1963 | Kucera | 239/666 X |
| 3,097,851 | 7/1963 | Cohrs et al. | 239/679 |
| 4,498,630 | 2/1985 | Sadler | 239/679 X |
| 4,804,145 | 2/1989 | Seymour et al. | 239/666 |
| 4,968,211 | 11/1990 | Compton | 239/679 X |

FOREIGN PATENT DOCUMENTS 471199 10/1914 France ................................. 239/681

Primary Examiner—Andres Kashnikow
Assistant Examiner—William Grant

[57] ABSTRACT

A fine material distributing machine having a container adapted to be movable over the ground, a conveyor at least partially housed within the container to be cooperable therewith to move fine material reposed within the container toward a discharge opening in the container, and a brush-type distributing mechanism positioned at the discharge opening to engage material conveyed thereto by the conveyor to effect a discharge thereof from the container to the surface of the ground, is disclosed wherein the brush-type distributing mechanism has resilient bristles which engage a structural member to cause a deflection thereof counter to the direction of rotation of the distributing mechanism as the bristles are engaging material conveyed thereto for enhancing the discharge of material from the container. The machine is also provided with a metering device to control the flow of fine material to the distributing mechanism and a dispersing panel for directing the discharged material into a spread pattern wider than the overall width of the machine. The dispersing panel is pivotally mounted to be selectively engageable with the cylindrical brush to effect a deflection of the bristles and to project upwardly extending dispersal fins into engagement with the rotating brush.

16 Claims, 3 Drawing Sheets 5,170,948

FINE MATERIAL DISTRIBUTOR

BACKGROUND OF THE INVENTION

The present invention relates generally to spreading or distributing machines operable to spread fine material, such as grass clippings or sand, over the surface of the ground, and, more particularly, to improvements in a brush-type material distributor to enhance the precise spreading of such fine materials.

Prior art spreading or distributing machines are provided with a container to hold a supply of fine material to be spread over the ground and a conveyor cooperable with the container to move amounts of the material to a distributing mechanism that engages the material and effects a discharge thereof from the container over the surface of the ground in a desired spread pattern. The distributing mechanism is typically an impact-type mechanical device, such as a beater or distributing disc, that engages the material to be distributed and centrifugally throws the material from the machine toward the ground.

It has been found that a better spread pattern can be obtained with fine material by the utilization of a brush-type distributing mechanism such as found on street sweepers or the like. One such brush-type distributing mechanism can be seen in U.S. Pat. No. 4,804,145 as part of a compost spreading machine. This particular machine utilizes a brush-type distributer to shred across the face of the material in the container and discharge the engaged material to the ground. This particular distributing mechanism has limited ability to break up clumps of the fine material in the container and to effect a wide discharge of material from the container. Furthermore, there is a limited ability to handle a wide variety of fine materials because of the lack of a metering device to limit the engagement of the material with the distributor in instances where the fine material has flow characteristics somewhat like a liquid.

Accordingly, it would be desirable to provide a machine for the precise distribution of fine material that would effectively spread fine material over the surface of the ground in a spread pattern wider than the overall width of the machine and which would be useable with a variety of fine materials irrespective of the tendency of the material to clump together.

SUMMARY OF THE INVENTION

It is an object of this invention to provide a machine for the precise distribution of fine material that would effectively spread fine material over the surface of the ground in a spread pattern wider than the overall width of the machine.

It would be another object of this invention to provide a fine material distributing machine which would be useable with a variety of fine materials irrespective of the flow characteristics of the material or the tendency of the material to clump together.

It would be an object of this invention to provide a fine material distributing machine that utilizes an adjustable metering mechanism to limit the movement of material to the distributing mechanism.

It is yet another object of this invention to provide a fine material distributing machine utilizing a brush-type distributing mechanism in which the resilient bristles of the brush-type distributor are deflected by a structural member of the machine as the distributing mechanism engages the material being spread to enhance the precise spread pattern of the material being spread and to break up clumps of material being engaged by the distributing mechanism.

It is another object of this invention that the brush-type distributing mechanism is cooperable with a dispersing device after the bristles of the distributing mechanism have released from the deflection incurred through engagement thereof with the structural member to enhance the spread pattern of the material wider than the overall width of the machine.

It is an object of this invention to provide a metering device which is infinitely adjustable between maximum limits to provide control over the flow of material from the container to the distributing mechanism so that the fine material distributing machine can be utilized with a wide variety of fine materials irrespective of the flow characteristics thereof.

This invention is incorporated into a fine material distributing machine comprising a container adapted to be movable over the ground, a conveyor at least partially housed within the container to be cooperable therewith to move fine material reposed within the container toward a discharge opening in the container, a brush-type distributing mechanism positioned at the discharge opening to engage material conveyed thereto by the conveyor to effect a discharge thereof from the container to the surface of the ground, the brush-type distributing mechanism having resilient bristles which engage a structural member to cause a deflection thereof counter to the direction of rotation of the distributing mechanism as the bristles are engaging material conveyed thereto for enhancing the discharge of material from the container.

The invention also includes a dispersal device engageable with said brush-type distributing mechanism after the resilient bristles release from engagement with the structural member effecting a deflection thereof to impart additional energy into the discharged material and, thereby, enhance the spread of the material in a pattern wider than the overall width of the fine material distributing machine.

This invention also includes an adjustable metering device disposed between the container and the brush-type distributing mechanism to control the flow of material from the container through the discharge opening to the distributing mechanism so that the machine is operable with a variety of fine materials irrespective of the flow characteristics of the material, the metering device being infinitely adjustable over a given range of positions.

BRIEF DESCRIPTION OF THE DRAWINGS

Other objects, advantages, and novel features of the present invention will become apparent from the following detailed disclosure of the invention, especially when considered in conjunction with the accompanying drawings.

FIG. 1 is a top plan view of the fine material distributing machine incorporating the principles of the instant invention, the central portion of the container being broken away, as is the hitch portion of the frame;

FIG. 2 is an enlarged partial cross-sectional view of the rear of the machine corresponding to FIG. 2—2 of FIG. 1 to show a side elevational view of the distributing mechanism positioned at the discharge end of the container, the metering apparatus being shown in a lowered position and the dispersal fins being positioned into engagement with the brush-type distributing mechanism; and FIG. 3 is a partial cross-sectional view of the machine similar to that of FIG. 2 with the metering device being shown in a fully raised position and the dispersal fins being dropped out of engagement with the brush-type distributing mechanism which is schematically depicted.

DETAILED DESCRIPTION OF THE PREFERRED EMBODIMENT

Figure 1:
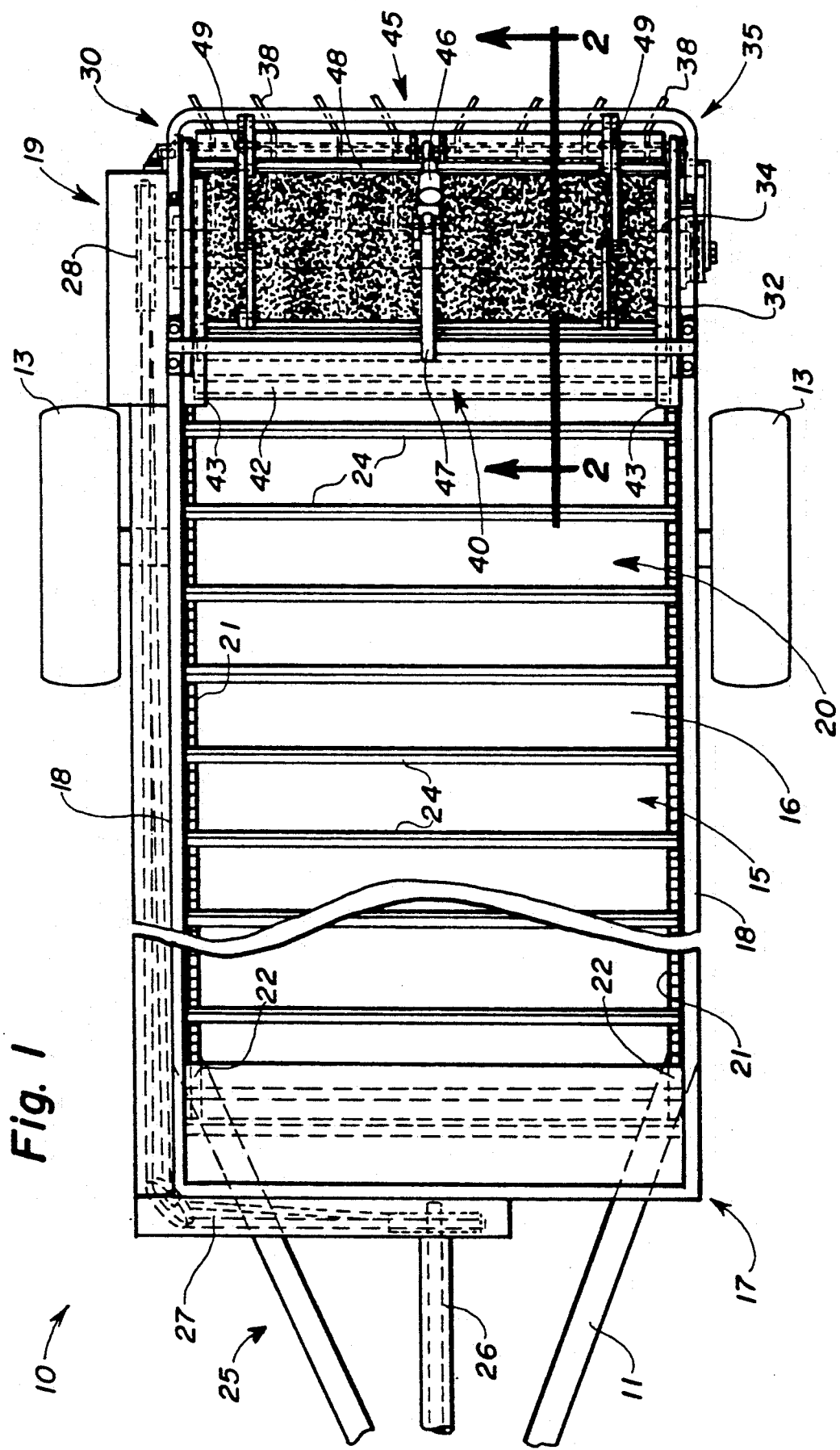

Referring now to all of the drawings, the fine material distributing machine can best be seen. The distributing machine 10 is provided with a frame 11 rotatably supporting ground engaging wheels 13 for mobile movement of the machine 10 over the surface of the ground. The frame 11 terminates at the forward end thereof in a conventional hitch mechanism (not shown) to permit connection thereof to a source of motive and operational power, such as a tractor (not shown). Although the machine 10 could conceivably be constructed as a self-propelled apparatus, or be provided with its own self-contained power source, such as an onboard gasoline engine, it is preferable that the machine 10 be adapted for connection to a separate source of motive and operational power.

The machine 10 includes a box-like container 15 having an open top and being enclosed by the bottom or floor 16, forward end 17 and transversely spaced, longitudinally extending sides 18 thereof to provide a receptacle capable of retaining a supply of fine material for transport thereof from one location to another location at which the material is desired to be distributed to the ground. The open-top configuration of the container 15 permits an easy and convenient means of loading fine material into the container 15, simply by dumping the material into the container 15 over the sides 18 thereof by a conventional loader. The rearward end 19 of the container 15 is generally open to define a discharge end of the container 15. One skilled in the art will readily realize that other container configurations are equally applicable.

Figure 2:
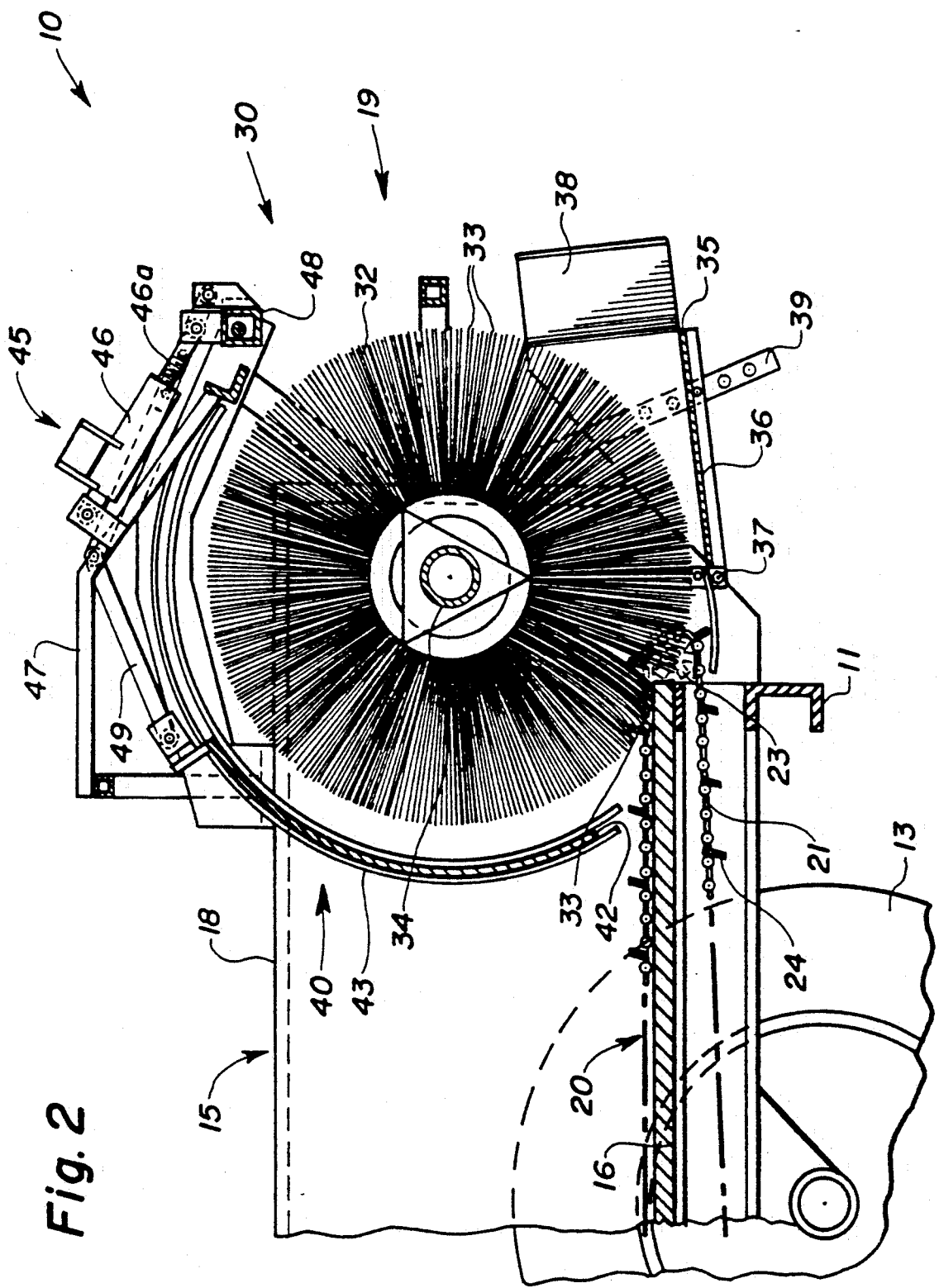
Figure 3:
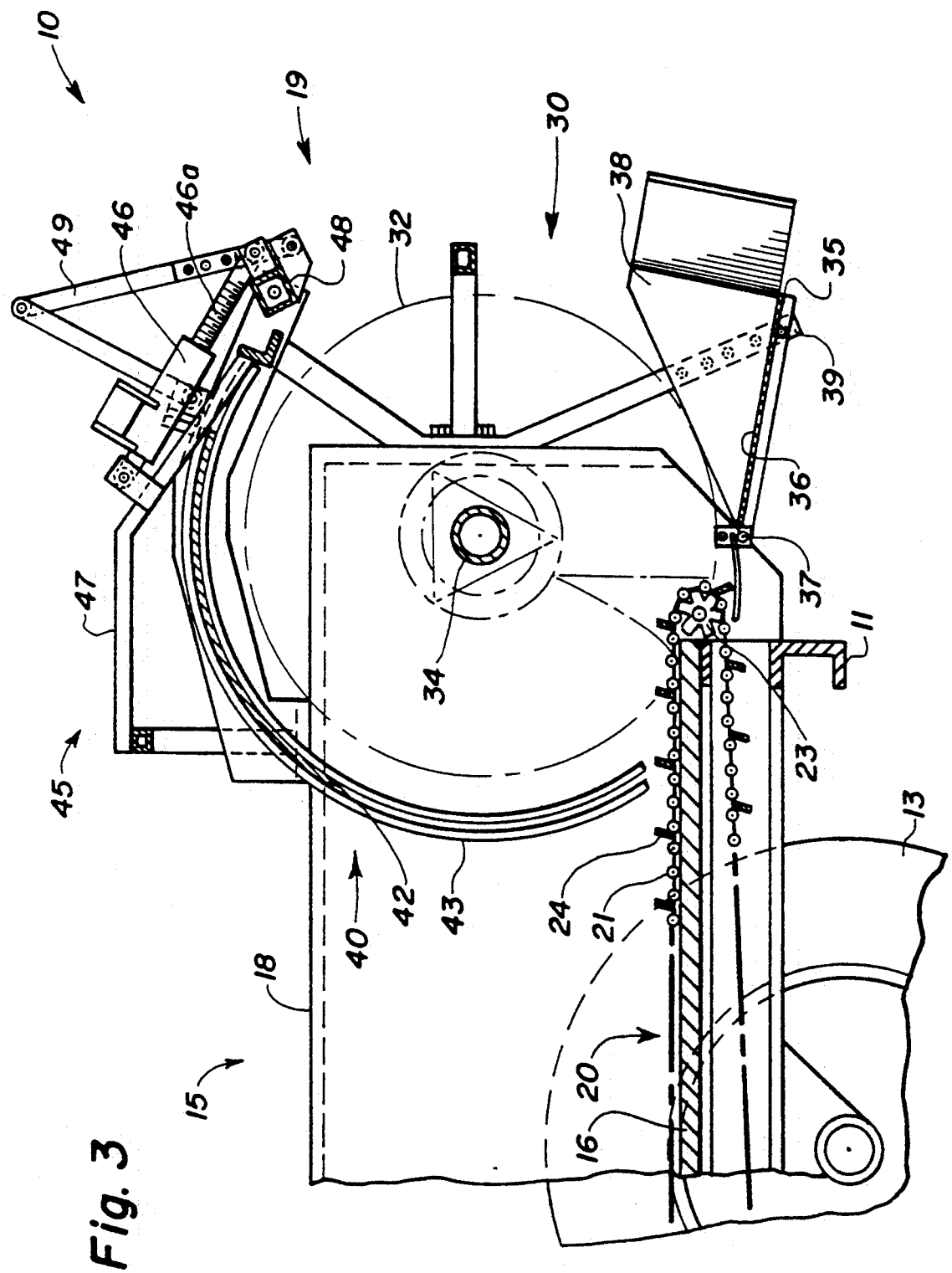

The machine 10 is also provided with a conveyor 20 which is operable to convey material within the container 15 toward the discharge end 19. The conveyor 20 is depicted in the drawings as being a conventional chain and slat conveyor 20 comprising a pair of laterally spaced endless chains 21 entrained around idler sprockets 22 at the forward end of the machine 10 and drive sprockets 23 at the rearward end of the machine 10, and being positioned along the opposing lateral sides 18 of the container 15. The longitudinally extending endless chains 21 are interconnected by transversely extending and longitudinally spaced slats 24 which are operable to drag material along the bottom floor 16 of the container 15 toward the discharge end 19. As is best seen in FIGS. 2 and 3, the conveyor 20 encircles the bottom floor 16 fore-and-aft thereof and is rotatably driven to move rearwardly toward the discharge end 19 of the container 15 above the floor and toward the forward end 17 below the floor. The junction between the forward end 17 and the floor 16 of the container 15 is adapted in a conventional manner to permit the passage of the conveyor 20.

The machine 10 is also provided with a drive mechanism 25 having a driven shaft member 26 adapted for connection with a conventional source of rotational power (not shown), such as the power-takeoff of the tractor (not shown) to which the machine 10 is connected. The drive mechanism 25 can take any one of many configurations, such as a traditional gearbox and drive shaft design, but is depicted in the drawings as including an endless belt 27 positioned around the outside of the container 15 to deliver rotational power in a conventional manner from the shaft member 26 to a power transfer apparatus 28 which is operably connected to the rear sprockets 23 to effect a driving of the rotation of the conveyor 20 and to the brush-type distributing mechanism 30 for effecting rotation thereof as described in greater detail below.

A brush-type distributing mechanism 30 is positioned at the discharge end 19 of the container 15 to engage material conveyed rearwardly thereto by the conveyor 20. The distributing mechanism 30 includes a cylindrical brush 32 rotatably supported by the container 5 for rotation about a transverse axis spaced above the floor 16. The rotary brush 32 is comprised of a plurality of individual resilient bristles 33 affixed to a central tubular shaft 34 coinciding with and defining the transverse axis of rotation of the cylindrical brush 32.

As best seen in FIGS. 2 and 3, the rotary brush 32 is oriented with respect to the floor 16 so as to impact the rear edge thereof as the cylindrical brush 32 rotates. Because of this intentional interference between the rotary brush 32 and the floor 16, the resilient bristles 33 must deflect counter to the direction of rotation of the cylindrical brush 32 in order to clear the floor 16. Since the bristles 33 are relatively stiff, yet resilient, the bristles 33 snap back to the radially extending orientation in which they were positioned immediately prior to engaging the floor 16. Due to the longitudinal encircling of the floor 16 by the chain and slat conveyor 20, the conveyor 20 also plays a small part in effecting a deflection of the bristles 33.

A dispersing panel 35 is pivotally supported relative to the floor 16 immediately rearwardly of the distributing mechanism 30. The dispersing panel 35 comprises a pan member 36 pivotally attached by a pivot mechanism 37 connected at opposing sides thereof to the respective side walls 18 of the container 15. The pan member 36 supports a plurality of rigid dispersal fins 38 extending upwardly therefrom and generally radially outwardly relative to the longitudinal center of the machine 10 to direct material discharged off the rotary brush 32 outwardly beyond the respective side walls 18 of the container 15.

The dispersing panel 35 is pivotally movable relative to the rotary brush 32 into and out of engagement with the rotary brush 32, as shown in the relative positions shown in FIGS. 2 and 3. A pair of aperatured brackets 39 positioned along opposing sides of the pan member 36 are used to fix the selected pivoted position of the dispersing panel 35. The dispersing panel 35 can be positioned closer to the tubular shaft 34 than the position depicted in FIG. 2, so that the pan member 36 engages the resilient bristles 33 for a further deflection thereof in addition to the deflection caused by the interference with the floor 16, or instead thereof.

To control the passage of material from the container 15 through the discharge end 19 thereof, the machine 10 is provided with a metering mechanism 40 positioned immediately forwardly of the rotary brush 32. The metering mechanism 40 includes a gate member 42 supported for generally vertical movement by the side walls 18 of the container 15 to control the effective size of the discharge opening from the container 15. Arcuate guides 43 are affixed to the respective side walls 18 to direct the movement of the gate member 42. An actuating mechanism 45 is supported by the frame 11 above the brush-type distributing mechanism 30 and operatively connected to the gate member 42 to effect selective movement thereof. The gate member 42 is infinitely positionable between a lowered position similar to that depicted in FIG. 2 and a fully raised position as depicted in FIG. 3.

The fully lowered position of the gate member 42 permits the gate member to act as an enclosure for the discharge end 19 of the container 15 to help retain the material within the container 15 for transport thereof. A raising of the gate member 42 will permit the operator to restrict the size of the discharge opening at the discharge end 19 for the flow of material conveyed to the rotary brush 32 by the conveyor 20. For unrestricted flow of material to the distributing mechanism 30, the gate member 42 can be raised into the fully raised position.

The actuating mechanism 45 includes a linear actuator 46 positioned along the longitudinal centerline of the machine 10 and fixed relative to the frame 11 by a support member 47. While the actuator 46 may be hydraulically activated, such as by a hydraulic cylinder, greater flexibility in operation is obtained by use of an electrical actuator having an extensible internally threaded rod 46a forming a part thereof. A transversely extending pivot shaft 48 is connected to the extensible rod 46a and is rotatable in conjunction with the extension and retraction of the rod 46a. A linkage apparatus 49 interconnects the pivot shaft 48 with the gate member 42 along the opposing transversely spaced sides 18 thereof to transfer a rotation of the pivot shaft 48 into a raising and/or lowering of the gate member 42. This configuration of the metering mechanism 40, utilizing a positionally adjustable gate member 42 guided for movement along an arcuate path substantially coaxial with the cylindrical brush 32 permits a compact design in which the gate member 42 and actuating mechanism 45 do not project significantly above the container 15, thereby permitting operation of the machine 10 in spaces that might be otherwise confining.

In operation, the fine material distributing machine 10 can be loaded with a variety of materials for transport from the location of storage of the material to the location of desired distribution of the material, as the container 15 with the gate member 42 in the fully lowered position provides an enclosed receptacle for receipt of such materials. Once the material distributing machine 10 has been hitched and operatively connected to a source of power, such as a tractor, the material loaded therein can be transported to the location desired for distribution of the material. An energizing of the drive mechanism 25 starts the rotational movement of the brush-type distributing mechanism 30 and the conveyor 20. One skilled in the art will readily realize that the power transfer apparatus 28 must be arranged in a known manner to provide for a relatively rapid rotation of the cylindrical brush 32 while providing for a relatively slow advancing of the conveyor 20 over the floor 16 of the container 15.

A raising of the metering mechanism 40 a given amount will permit the material within the container 15 to be conveyed by the conveyor 20 through the discharge opening to the brush-type distributing mechanism 30. The rapidly rotating cylindrical brush 32 engages the material being conveyed thereto while the resilient bristles 33 deflect backward due to the interfering engagement between the rotary brush 32 and the floor 16. As the bristles 33 snap back into their undeflected, radially extending orientation, additional energy is imparted to the material which is propelled off of the rotary brush 32 and through the dispersing panel 35, which serves to widen the spread pattern of the brush-type distributing mechanism 30 beyond the side walls 18 of the machine 10.

This deflecting action of the bristles 33 results in a fine disintegration of any clumps of material being conveyed to the discharge end 19 of the container 15. Furthermore, the additional energy imputed into the discharge of the material from the machine 10 by the deflecting bristles snapping back into their undeflected, radially extending position outwardly from the central tubular shaft imparts energy into the discharged material and results in a more forcible discharge of this material through the dispersing panel, which in turn results in a wider and more finely distributed spread of material than heretofore known in such material distributing machines.

The pivotal movement of the dispersing panel 35 relative to the rotating cylindrical brush 32 allows a range of engagement of the material with the fins 38 effecting the dispersal of the material outwardly beyond the side walls 18 of the machine 10. Furthermore, the dispersing panel 35 can be pivoted into a position in which the pan member 36 also interferes with the bristles 33 of the rotating cylindrical brush 32 to cause some deflection thereof and, thereby, change the trajectory of the discharge of material from the distributing mechanism 30.

The metering mechanism 40 serves to limit the flow of material from within the container 15 to the distributing mechanism 30. In instances where the material being distributed is relatively fluid, such as dry sand, the limiting effect of the metering mechanism 40 restricts the amount of material reaching the rotary brush 32 such that the distributing mechanism 30 can distribute a fine layer of the material over the surface of the ground behind the machine 10 without clumps of the material discharged to the ground. In material such as wet grass clippings wherein small clumps of material might form, the height of the positionally adjustable gate member 42 would be limited so that a fine distribution of the clippings could be effected while the small clumps would be broken up by the rotary brush 32.

Conversely, material that has a great tendency to clump together in the container 15, such as baled peat moss, can be equally distributed in a fine layer over the surface of the ground by raising the gate member 42 for greater access to the material by the rotary brush 32. Furthermore, the need to provide a heavy application of materials to the surface of the ground would also result in the wide opening of the positionally adjustable gate member 42. It has been found that a distributing machine 10 built in accordance with the embodiment described herein was able to distribute grass clippings over a golf course without any objectionable clumped deposits spread over the ground. By proper utilization of the metering mechanism 40, the material distributing machine 10 can effectively and efficiently spread a large variety of fine materials without clumping.

An alternative embodiment to the above-described preferred embodiment would incorporate a separate brush deflection member spanning the width of the rear discharge end 19 of the container 15 in close proximity to the floor 16, but in a position that would require engagement of the rotary brush 32 to cause deflection of the bristles 33 just prior to discharge of the material from the container 15. In such an embodiment, the brush 32 would not necessarily need to engage the floor 16 or the conveyor 20 to obtain deflection of the bristles 33. However, in some materials, such a deflection member may impede the flow of material from the container 15 and, therefore, may be undesirable.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. A material distributing machine comprising:
    a mobile frame adapted to movement over the surface of the ground;
    a container supported by said frame above the surface of the ground to receive a supply of material to be distributed, said container having a discharge opening therein;
    a conveyor operably cooperable with said container to convey material therein toward said discharge opening;
    a distributing mechanism rotatably mounted at the discharge opening of said container to engage material conveyed thereto by said conveyor, said distributing mechanism including a cylindrical brush rotatable about a transversely extending axis of rotation and having a plurality of radially extending resilient bristles;
    means for deflecting said bristles counter to the direction of rotation off said cylindrical brush as said bristles are engaging said material to facilitate the discharge of the material from the discharge opening of said container;
    a dispersing panel mounted adjacent said distributing mechanism to receive material discharged therefrom and direct the discharged material along a spread pattern wider than said machine, said dispersing panel including upwardly extending dispersal fins, said dispersing panel being pivotally mounted for movement relative to said cylindrical brush such that said fins are engageable into said cylindrical brush at variably selectable depths; and
    drive means for operably powering said conveyor and said distributing mechanism.

2. The material distributing machine of claim 1 wherein said machine further comprises:
    a metering mechanism supported by said container at said discharge opening to limit the flow of material conveyed by said conveyor to said distributing mechanism, said metering mechanism being adjustable to vary the rate of material flow to said distributing mechanism.

3. The material distributing machine of claim 2 wherein said container includes a lower floor portion against which said conveyor cooperates to convey material toward said discharge opening, said means for deflecting being a positioning of said floor portion into an interference with the rotation of said cylindrical brush.

4. The material distributing machine of claim 3 wherein said conveyor longitudinally encircles said floor portion and is rotatable thereabout to convey said material toward said discharge opening, said conveyor also being positioned to cause interference with the rotation of said cylindrical brush as said conveyor rotates around said floor portion.

5. The material distributing machine of claim 1 wherein said fins are mounted on a pivoted pan member so as to be engageable into said cylindrical brush at selective depths to control the width of the spread pattern from said container.

6. The material distributing machine of claim 5 wherein said dispersing panel can be pivotally positioned such that said pan member will cause a deflection of said bristles during rotation of said cylindrical brush.

7. The material distributing machine of claim 6 wherein said metering mechanism includes a positioning adjustable gate member guided by arcuate guide members into an arcuate path generally coaxial with said cylindrical brush.

8. The material distributing machine of claim 7 wherein said metering mechanism further includes a selectively operable linear actuator and a linkage apparatus interconnecting said linear actuator and said gate member to convert the linear movement of said actuator into an arcuate movement of said gate member as directed by said guide members, the movement of said gate member relative to said floor portion controlling the effective size of said discharge opening and the amount of material being conveyed by said conveyor to said distributing mechanism.

9. In a material distributing machine having a mobile frame adapted for movement over the surface of the ground; a container supported by said frame above the surface of the ground to receive a supply of material to be distributed, said container having a generally horizontally extending floor member and a generally vertical discharge opening; a conveyor operably cooperable with said floor member to convey material within said container along said floor member toward said discharge opening; and a distributing mechanism rotatably mounted at the discharge opening of said container to engage material conveyed thereto by said conveyor, said distributing mechanism including a cylindrical brush rotatable about a transversely extending axis of rotation spaced above said floor member and having a plurality of radially extending resilient bristles, the improvement comprising:
    a positioning of said cylindrical brush into an interfering position relative to said floor member such hat said bristles engage said floor member and said conveyor upon rotation of said cylindrical brush to cause a deflection of said bristles counter to the rotation of said cylindrical brush, the disengagement of said bristles from said floor member allowing said resilient bristles to return to their radially extending orientation and, thereby, impart energy to said material being discharged from said container; and
    a dispersing panel mounted adjacent said distributing mechanism to receive material discharged therefrom and direct the discharged material along a spread pattern substantially wider than said machine, said dispersing panel including a pivoted pan member and upwardly extending fins attached to said pin member, said pan member being pivotally movable relative to said cylindrical brush to insert said fins into said cylindrical brush at selectively variable depths to control the width of said spread pattern.

10. The material distributing machine of claim 9 wherein said dispersing panel can be pivotally positioned such that said pan member will also cause a deflection of said resilient bristles during rotation of said cylindrical brush.

11. The material distributing machine of claim 10 wherein said machine further comprises:

a metering mechanism supported by said container at said discharge opening to limit the flow of material conveyed by said conveyor to said distributing mechanism, said metering mechanism being adjustable to vary the rate of material flow to said distributing mechanism.

12. The material distributing machine of claim 11 wherein said metering mechanism includes a positionally adjustable gate member guided by arcuate guide member supported by said container into an arcuate path generally coaxial with said cylindrical brush, a selectively operable linear actuator, and a linkage apparatus interconnecting said linear actuator and said gate member to convert the linear movement of said actuator into an arcuate movement of said gate member as directed by said guide members, the movement of said gate member relative to said floor member controlling the effective size of said discharge opening and the amount of material being conveyed by said conveyor to said distributing mechanism.

13. In a material distributing machine having a mobile frame adapted for movement over the surface of the ground; a container supported by said frame above the surface of the ground to receive a supply of material to be distributed, said container having a generally horizontally extending floor member and a generally vertical discharge opening; a conveyor operably cooperable with said floor member to convey material within said container along said floor member toward said discharge opening; a distributing mechanism rotatably mounted at the discharge opening of said container to engage material conveyed thereto by said conveyor, said distributing mechanism including a cylindrical brush rotatable about a transversely extending axis of rotation spaced above said floor member and having a plurality of radially extending resilient bristles; and a dispersing panel for guiding material discharged by said distributing mechanism into a spread pattern wider than the transverse width of said container, the improvement comprising:

a pivotal mounting of said dispersing panel for movement relative to said cylindrical brush, said dispersing panel being pivotally positionable to engage said cylindrical brush and to cause a deflection of said resilient bristles counter to the direction of rotation of said cylindrical rush during rotation thereof, the disengagement of said bristles from said dispersing panel allowing said resilient bristles to return to their radially extending orientation and, thereby, impart energy to said material being discharged from said container, said dispersing panel having a plurality of dispersal fins pivotally movable with said dispersing panel to be engageable at selectively variable depths into said cylindrical brush to guide the material being discharged therefrom into a spread pattern substantially wider than said machine, the width of said spread pattern being a function of the depth of engagement of said dispersal fins into said brush.

14. The material distributing machine of claim 13 wherein said dispersing panel has a pan member engageable with said resilient bristles during rotation of said cylindrical brush to effect the deflection thereof, said dispersal fins being mounted to said pan member and projecting upwardly therefrom.

15. The material distributing machine of claim 14 wherein said cylindrical brush is positioned into an interfering position relative to said floor member such that said bristles engage said floor member upon rotation of said cylindrical brush to cause a deflection of said bristles counter to the rotation of said cylindrical brush.

16. The material distributing machine of claim 15 wherein said dispersing panel is pivotally positionable out of engagement with said cylindrical brush such that said fins receive material discharged from said cylindrical brush and deflect said discharged material into said spread pattern, the disengagement of said bristles from said floor member allowing said resilient bristles to return to their radially extending orientation and, thereby, impart energy to said material being discharged therefrom.

* * * * *